United States Patent
Xiao et al.

(10) Patent No.: US 9,182,943 B2
(45) Date of Patent: Nov. 10, 2015

(54) METHODS AND DEVICES FOR PRIME NUMBER GENERATION

(71) Applicant: QUALCOMM Incorporated, San Diego, CA (US)

(72) Inventors: Lu Xiao, San Diego, CA (US); Bijan Ansari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 13/791,514

(22) Filed: Mar. 8, 2013

(65) Prior Publication Data

US 2014/0258353 A1    Sep. 11, 2014

(51) Int. Cl.
G06F 7/58    (2006.01)
G06F 7/72    (2006.01)
H04L 9/30    (2006.01)

(52) U.S. Cl.
CPC .. *G06F 7/58* (2013.01); *G06F 7/72* (2013.01); *H04L 9/3033* (2013.01); *G06F 2207/7204* (2013.01)

(58) Field of Classification Search
CPC ............ G06F 7/58; G06F 7/72; H04L 9/3033
USPC ................................................. 708/250–256
See application file for complete search history.

(56) References Cited

U.S. PATENT DOCUMENTS

| 4,947,430 | A  | 8/1990 | Chaum   |
| 6,404,890 | B1 | 6/2002 | Lenstra |

| 2002/0156819 | A1 | 10/2002 | Oerlemans |
| 2008/0310634 | A1 | 12/2008 | Pavlovic  |
| 2011/0142231 | A1 | 6/2011  | Takeda    |

FOREIGN PATENT DOCUMENTS

JP    2001154580 A    6/2001

OTHER PUBLICATIONS

Fouque P A., et al., "Close to Uniform Prime Number Generation With Fewer Random Bits", Cryptology ePrint Archive, 2011, pp. 1-12, XP061005241, Retrieved from the Internet: URL:http//:eprint.iacr.org/2011/481.pdf [retrieved on Sep. 6, 2011].
International Search Report and Written Opinion—PCT/US2014/020306—ISA/EPO—Jul. 2, 2014.
Menezes A J., et al., "Handbook of Applied Cryptography", "Public-Key Parameters", "Chapter 4" 1997, CRC Press, Boca Raton, FL, USA, XP002241264, ISBN: 978-0-8493-8523-0, pp. 133-154.
Rabin M.O., "Digitalized signatures and public-key functions as intractable as factorization," 1979, 20 pages.

*Primary Examiner* — Tan V. Mai
(74) *Attorney, Agent, or Firm* — Loza & Loza, LLP

(57) ABSTRACT

One feature pertains to a method that reduces the computational delay associated with generating prime numbers. The method includes generating a first random number having a plurality of bits. A first primality test is then executed on the first random number. Then, it is determined whether the first random number generated fails or passes the first primality test. If the first random number fails the primality test then a portion but not all of the plurality of bits of the first random number are replaced with an equal number of randomly generated bits to generate a second random number. Next, a primality test is again executed on the second random number. This process is repeated until a prime number is detected.

20 Claims, 8 Drawing Sheets

METHODS AND DEVICES FOR PRIME NUMBER GENERATION

BACKGROUND

1. Field

Various features relate to methods and devices for prime number generation, and more particularly, to methods and devices that accelerate prime number generation.

2. Background

Prime numbers are used widely in public key cryptography. For example, RSA (Rivest, Shamir, Adleman) is one of the most widely used public key ciphers that requires prime numbers for its key generation process. Prime numbers used in cryptography must be large enough to ensure a large key space, which frustrates brute force attacks.

Typical prime numbers that may be used for an RSA cryptography scheme may be, for example, 1,024 bits, which results in a 2,048 bit public/private key pair. At this time, generating prime numbers this large is time consuming even for personal computers and servers having relatively advanced processors and results in noticeable delay. This delay becomes a critical factor that affects mobile computing when RSA key generation is needed for certain applications, e.g., Trusted Platform Module (TPM) and smart cards (UICC). Generating 1,024 bit prime numbers in the latest ARM based processors may take a delay on the order of seconds, which significantly affects the user experience. Thus, any methods that accelerate prime number generation will benefit cryptographic applications, especially in mobile computing applications.

FIG. 1 illustrates a typical method 100 found in the prior art to generate a prime number. First, a random number R of n words is generated using either a true random number generator (RNG) or a high quality pseudo random number generator (PRNG) 102. Second, a "primality test" is executed on the candidate number R 104. A "primality test" is an algorithm for determining whether a number is prime. In many cases, primality tests are actually composite number tests (i.e., they determine whether a number is a composite number) that are probabilistic in nature. Examples of such tests include the Miller-Rabin primality test and Solovay-Strassen primality test.

Third, if the candidate number R passes the primality test (i.e., the number R is probably prime) then R may be used as a prime number in the key generation process 106. Otherwise, if the candidate number R fails the primality test (i.e., the number R is determined not to be prime), then the number R is discarded and a completely new random number $R_2$ is generated 108 and the above steps 104, 106, and/or 108 are repeated.

Although the primality test contributes a majority of the delay associated with prime number generation, another significant contributor of the delay is due to the time spent generating new random numbers R (i.e., step 102) after it is determined that a candidate random number is not prime (i.e., step 108). The probability of a randomly selected number R being prime is very low. For example, according to the prime number theorem the probability that a 1,024-bit number is prime is about is 1 in 710 (1/ln ($2^{1024}$)). For this reason, a candidate prime number may be discarded (i.e., step 108) and a new candidate prime number may be generated (i.e., step 102) numerous times before a candidate prime number is confirmed (to a certain degree) to be prime (i.e., step 106).

Thus, there exists a need to accelerate prime number generation so that the overall delay associated with generating and determining a number to be prime is reduced. Applications related to cryptography that rely on prime number generation may derive significant benefits from such accelerated prime number generation schemes.

SUMMARY

One feature pertains to a method of generating a prime number that comprises generating a first random number having a plurality of bits, executing a first primality test on the first random number generated, determining that the first random number generated failed the first primality test, replacing a portion but not all of the plurality of bits of the first random number with an equal number of randomly generated bits to generate a second random number, and executing a second primality test on the second random number. According to one aspect, the method further comprises determining that the second random number failed the second primality test, and replacing portions but not all of the plurality of bits of the second random number with equal numbers of randomly generated bits and running successive primality tests on the second random number until it is determined that the second random number passes one of the successive primality tests. According to another aspect, the first random number comprises a plurality of x-bit words, and the portion of the plurality of bits replaced is a first x-bit word. According to yet another aspect, the method further comprises rotating the first random number to the left or right by at least one x-bit word prior to replacing the portion of the plurality of bits with the first x-bit word.

According to one aspect, the portion of the plurality of bits replaced form a contiguous block of bits. According to another aspect, the portion of the plurality of bits replaced are random bits of the plurality of bits that have, in part, non-contiguous bit numbers. According to yet another aspect, the first random number and the second random number each have at least eight (8) bits and the portion of the plurality of bits replaced is at least two (2) bits. According to another aspect, the method further comprises determining that the second random number failed the second primality test, replacing a portion but not all of a plurality of bits of the second random number with an equal number of randomly generated bits to generate a third random number, and executing a third primality test on the third random number.

According to one aspect, the first and second random numbers each comprise a plurality of x-bit words, and the portion of the plurality of bits of the first random number replaced is a first x-bit word, and the portion of the plurality of bits of the second random number replaced is a second x-bit word. According to another aspect, the first x-bit word and the second x-bit word have different word numbers. According to yet another aspect, the first x-bit word and the second x-bit word have contiguous word numbers. According to another aspect, the first x-bit word and the second x-bit word have non-contiguous word numbers.

According to one aspect, the first and second random numbers each comprise a plurality of x-bit words, and the portion of the plurality of bits of the first random number replaced to generate the second random number is a first x-bit word, and the method further comprises determining that the second random number failed the second primality test, and replacing the first x-bit word of the second random number with randomly generated x-bit words and running successive primality tests on the second random number until it is determined that the second random number passes one of the successive primality tests or it is determined that the first x-bit word of the second random number has been replaced a predefined number of times. According to another aspect, the method further comprises replacing a second x-bit word of the second random number with a randomly generated x-bit word if it is determined that the first x-bit word of the second random number has been replaced the predefined number of times.

Another feature pertains to a prime number generator comprising a random number generator circuit adapted to generate a first random number having a plurality of bits, a primality test circuit communicatively coupled to the random number generator circuit, the primality test circuit adapted to execute a first primality test on the first random number generated and determine that the first random number generated failed the first primality test, and a bit replacement circuit communicatively coupled to the primality test circuit, the bit replacement circuit adapted to replace a portion but not all of the plurality of bits of the first random number with an equal number of randomly generated bits to generate a second random number, wherein the primality test circuit is further adapted to execute a second primality test on the second random number. According to one aspect, the primality test circuit is further adapted to determine that the second random number failed the second primality test, and the bit replacement circuit is further adapted to replace portions but not all of the plurality of bits of the second random number with equal numbers of randomly generated bits and running successive primality tests on the second random number until it is determined that the second random number passes one of the successive primality tests. According to another aspect, the first random number comprises a plurality of x-bit words, and the portion of the plurality of bits replaced is a first x-bit word. According to yet another aspect, the bit replacement circuit is further adapted to rotate the first random number to the left or right by at least one x-bit word prior to replacing the portion of the plurality of bits with the first x-bit word.

According to one aspect, the primality test circuit is further adapted to determine that the second random number failed the second primality test, the bit replacement circuit is further adapted to replace a portion but not all of a plurality of bits of the second random number with an equal number of randomly generated bits to generate a third random number, and the primality test circuit is further adapted to execute a third primality test on the third random number. According to another aspect, the first and second random numbers each comprise a plurality of x-bit words, the portion of the plurality of bits of the first random number replaced to generate the second random number is a first x-bit word, the primality test circuit is further adapted to determine that the second random number failed the second primality test, and the bit replacement circuit is further adapted to replace the first x-bit word of the second random number with randomly generated x-bit words and running successive primality tests on the second random number until it is determined that the second random number passes one of the successive primality tests or it is determined that the first x-bit word of the second random number has been replaced a predefined number of times. According to yet another aspect, the bit replacement circuit is further adapted to replace a second x-bit word of the second random number with a randomly generated x-bit word if it is determined that the first x-bit word of the second random number has been replaced the predefined number of times.

Another feature pertains to a prime number generator comprising a means for generating a first random number having a plurality of bits, a means for executing a first primality test on the first random number generated, a means for determining that the first random number generated failed the first primality test, a means for replacing a portion but not all of the plurality of bits of the first random number with an equal number of randomly generated bits to generate a second random number, and a means for executing a second primality test on the second random number. According to one aspect, the prime number generator further comprises a means for determining that the second random number failed the second primality test, and a means for replacing portions but not all of the plurality of bits of the second random number with equal numbers of randomly generated bits and running successive primality tests on the second random number until it is determined that the second random number passes one of the successive primality tests. According to another aspect, the prime number generator further comprises a means for rotating the first random number to the left or right by at least one x-bit word prior to replacing the portion of the plurality of bits with the first x-bit word. According to yet another aspect, the prime number generator further comprises a means for determining that the second random number failed the second primality test, a means for replacing a portion but not all of a plurality of bits of the second random number with an equal number of randomly generated bits to generate a third random number, and a means for executing a third primality test on the third random number.

According to one aspect, the first and second random numbers each comprise a plurality of x-bit words, and the portion of the plurality of bits of the first random number replaced to generate the second random number is a first x-bit word, and the prime number generator further comprises a means for determining that the second random number failed the second primality test, and a means for replacing the first x-bit word of the second random number with randomly generated x-bit words and running successive primality tests on the second random number until it is determined that the second random number passes one of the successive primality tests or it is determined that the first x-bit word of the second random number has been replaced a predefined number of times. According to another aspect, the prime number generator further comprises a means for replacing a second x-bit word of the second random number with a randomly generated x-bit word if it is determined that the first x-bit word of the second random number has been replaced the predefined number of times.

Another feature pertains to a computer-readable storage medium having one or more instructions for generating prime numbers, the instructions which when executed by at least one processor causes the processor to generate a first random number having a plurality of bits, execute a first primality test on the first random number generated, determine that the first random number generated failed the first primality test, replace a portion but not all of the plurality of bits of the first random number with an equal number of randomly generated bits to generate a second random number, and execute a second primality test on the second random number. According to one aspect, the instructions when executed by the processor further cause the processor to determine that the second random number failed the second primality test, and replace portions but not all of the plurality of bits of the second random number with equal numbers of randomly generated bits and running successive primality tests on the second random number until it is determined that the second random number passes one of the successive primality tests. According to another aspect, the instructions when executed by the processor further cause the processor to rotate the first random number to the left or right by at least one x-bit word prior to replacing the portion of the plurality of bits with the first x-bit word. According to yet another aspect, the instructions when executed by the processor further cause the processor to determine that the second random number failed the second primality test, replace a portion but not all of a plurality of bits of the second random number with an equal number of randomly generated bits to generate a third random number, and execute a third primality test on the third random number.

According to one aspect, the first and second random numbers each comprise a plurality of x-bit words, and the portion of the plurality of bits of the first random number replaced to generate the second random number is a first x-bit word, and wherein the instructions when executed by the processor further cause the processor to determine that the second random number failed the second primality test, and replace the first x-bit word of the second random number with randomly generated x-bit words and running successive primality tests on the second random number until it is determined that the second random number passes one of the successive primality tests or it is determined that the first x-bit word of the second random number has been replaced a predefined number of times. According to another aspect, the instructions when executed by the processor further cause the processor to replace a second x-bit word of the second random number with a randomly generated x-bit word if it is determined that the first x-bit word of the second random number has been replaced the predefined number of times.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. As used herein, "primality tests" and "composite number tests" may be used interchangeably and are generally referred to as "primality tests." For example, tests such as the Miller-Rabin test may prove that a number is composite. By doing so the test also proves that the number is not prime. Thus, as used herein, executing a primality test on a number include those tests that prove or attempt to prove that a number is composite. As used herein, a "random number" may be truly random (e.g., it was generated by a true random number generator (RNG)) or it may be pseudo random (e.g., it was generated using a pseudo random number generator (PRNG)).

Overview

One implementation provides a method that reduces the computational delay associated with generating prime numbers. The method includes generating a first random number having a plurality of bits. A first primality test is then executed on the first random number. Then, it is determined whether the first random number generated fails or passes the first primality test. If the first random number fails the primality test then a portion but not all of the plurality of bits of the first random number are replaced with an equal number of randomly generated bits to generate a second random number. Next, a primality test is again executed on the second random number. This process is repeated (i.e., portions of bits of the random number under test) until a prime number is detected.

Exemplary Methods

Figure 2:
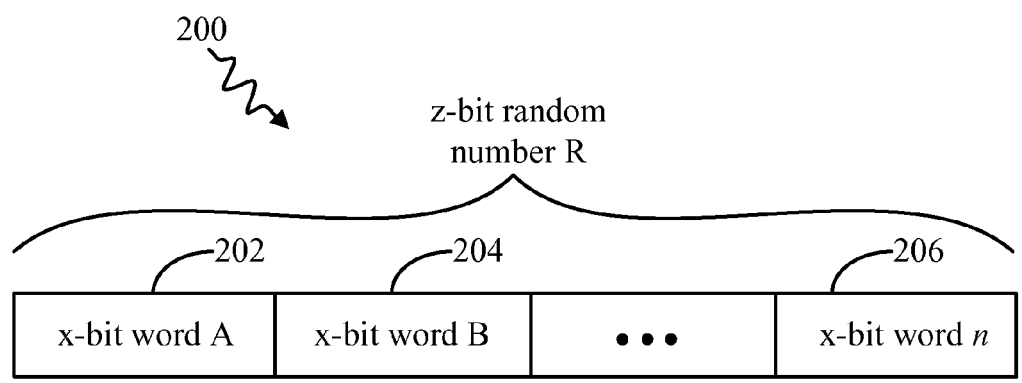
FIG. 2 illustrates a number R.

FIG. 2 illustrates a number R 200 according to one aspect of the disclosure. The number R 200 is a z-bit number comprising n x-bit words 202, 204, ... 206 where: z is equal to or greater than two (2); n is equal to or greater than two (2); and x is equal to or greater than one (1). Thus, the total number of bits z of the number R is equal to n*x. The number R 200 may be generated using a true random number generator or a pseudo random number generator. According to one example, the z-bit random number R 200 is a 1,024 bit number comprising thirty-two (32) words that are each thirty-two (32) bits. Of course, the random number R 200 may be any random number having a bit length greater than one and comprise a plurality of words each having one or more bits.

Figure 3:
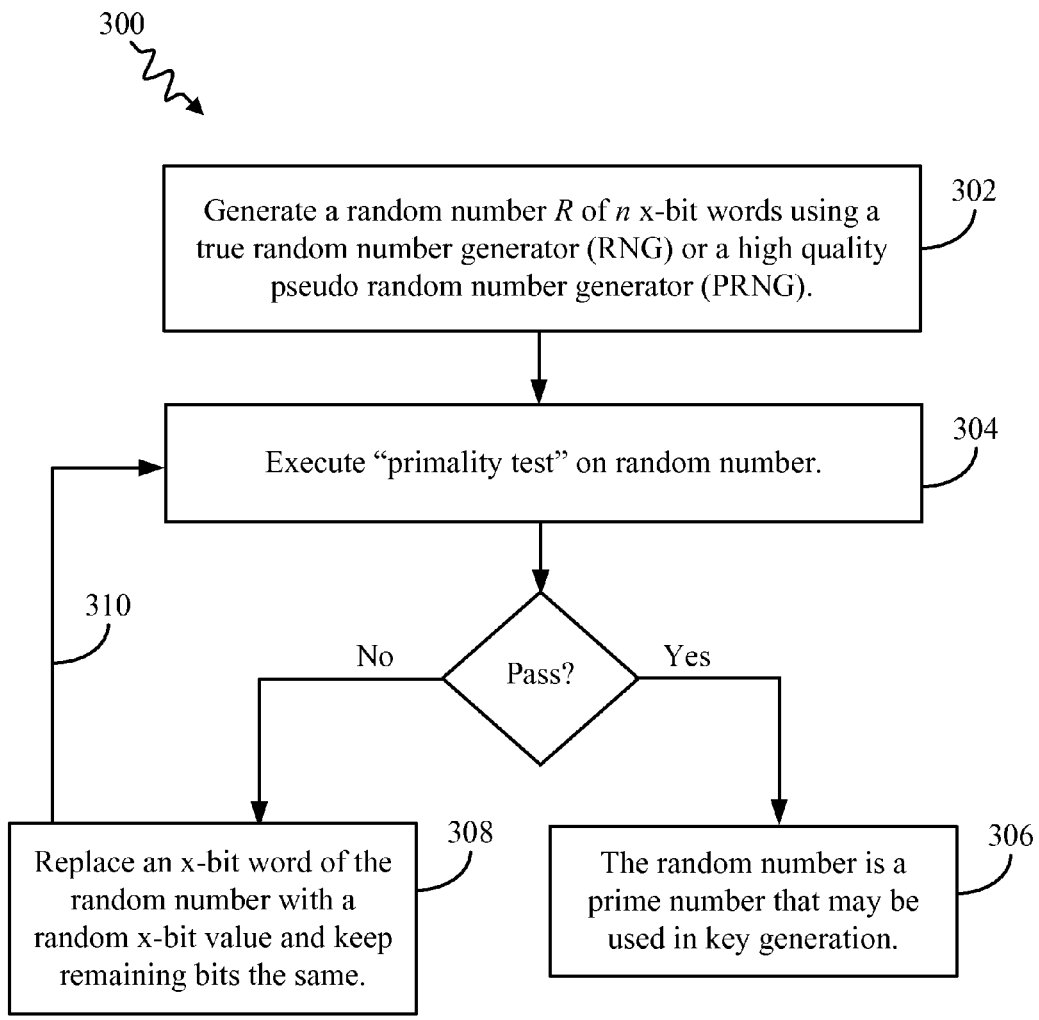
FIGS. 3-5 illustrate methods for prime number generation.

FIG. 3 illustrates a method 300 for prime number generation according to one aspect of the present disclosure. First, a z-bit random number R (e.g., number R 200 in FIG. 2) having n x-bit words is generated 302. The random number R is a candidate number that may or may not be prime. Next, a primality test (e.g., Miller-Rabin test) is executed on the candidate number R 304. If the candidate number R passes the primality test (i.e., it is determined to some degree of accuracy that R may be prime) then the random number R is selected as a prime number 306. The number R may then be, for example, used for key generation.

Otherwise, if the candidate number R fails the primality test (i.e., it is determined to some degree of accuracy that R is not prime) then an x-bit word (e.g., word 202 in FIG. 2) of the random number R is replaced with a randomly or pseudo-randomly generated x-bit value to form a new random number $R_2$ while the remaining bits/words are kept the same 308. The new random number $R_2$ is then fed back into the primality test 310. This process is repeated such that if the random number $R_2$ fails the primality test, then another, different x-bit word of $R_2$ (e.g., word 204 in FIG. 2) is replaced with a new randomly or pseudo-randomly generated x-bit value to form a new random number $R_3$, and the primality test is then executed on $R_3$. Eventually a prime number will be generated/detected and the process 300 is stopped. As just one example, the random numbers R, $R_2$, $R_3$, etc. generated may be 1,024 bit numbers composed of thirty-two 32-bit words.

Figure 1:
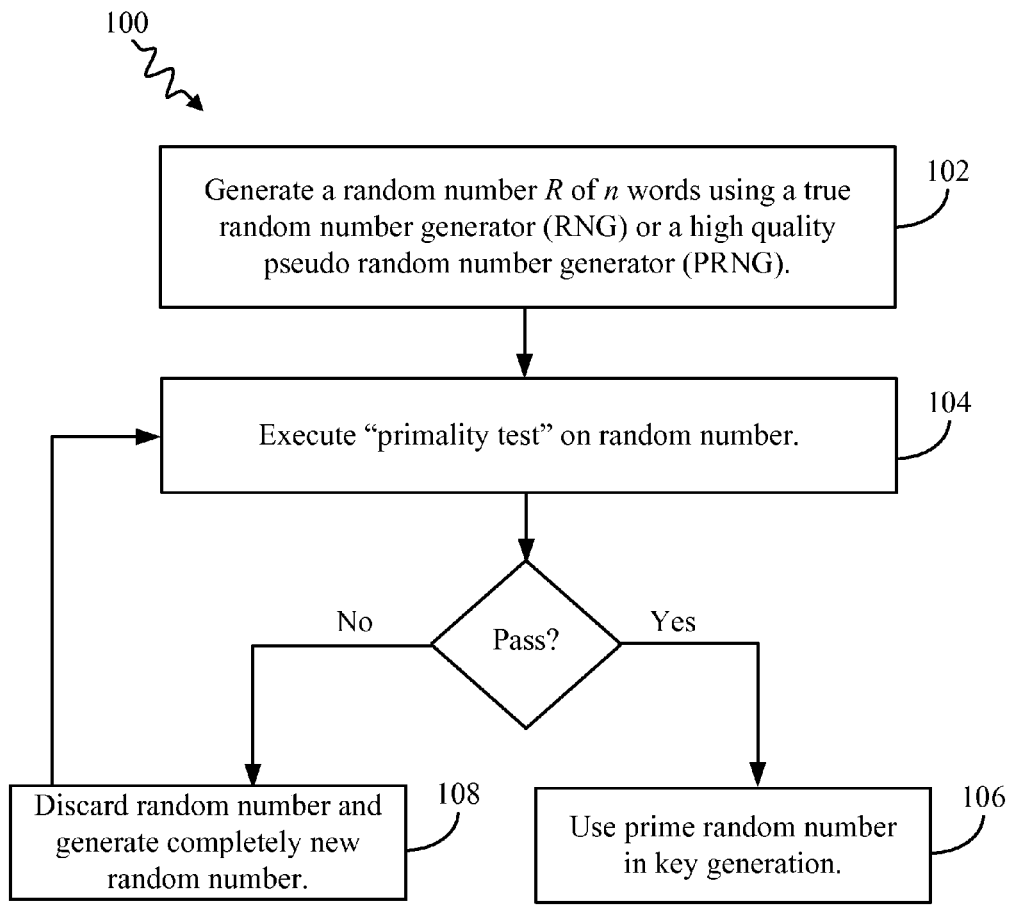
FIG. 1 illustrates a typical method found in the prior art to generate a prime number.

In this fashion, rather than replacing the entire random number R with a newly generated random number (see step 108 in FIG. 1), the present disclosure discloses methods where only a select portion(s) of the random number R, $R_2$, $R_3$, etc. is replaced and the primality test is rerun. For example, if a 1,024 bit candidate random number fails the primality test, a relatively small portion, such as a 32 bit portion, of the 1,024 bit number may be replaced with newly generated random bits while the remaining 992 bits are left untouched. Changing just 32 bits of a 1,024 bit number still allows for a lot of possible prime numbers (e.g., $2^{32}/(1024*\ln(2))$=6,051,101 prime numbers) to exist after the change. Therefore, the probability that a prime number does not exist without having to change the other 992 bits is very low. Thus, a lot of time may be saved by simply generating and replacing an x-bit word (e.g., 32 bit word) of a z-bit number (e.g., 1,024 bit number) rather than randomly generating an entirely new z-bit number (e.g., 1,024 bit number).

As one example, if the random number R is 1,024 bits and the x-bit words are each 32 bits, then the proposed methods may save 96.875% of the time associated with random number generation compared with prior art methods (e.g., method 100). Thus, even if random number generation only contributes to, for example, 10% of the overall delay associated with prime number generation, the proposed methods may reduce the overall prime number generation delay by approximately 9.7% for the example given.

As discussed above with respect to FIG. 3, if the newly generated candidate random number $R_2$, $R_3$, etc. fails the primality test then another x-bit portion of the candidate random number is replaced to generate a new random number. If, for example, the z-bit word comprises n x-bit words, then after n iterations of the process 300 (i.e., step 308 is performed n times because thus far no random number generated passes the primality test) the original candidate random number R will have been completely replaced word by word to form an entirely new random number. This ensures that the algorithm will always terminate such that a prime number is detected/generated since if the same x-bit word of the random number R were replaced with a newly generated random word while the remaining words were not, then there exists a very small chance that no prime numbers exist within those range of numbers associated with the x-bit word being replaced.

Referring to FIGS. 2 and 3, according to one aspect, step 308 of FIG. 3 may be performed such that each iteration of the process 300 replaces the x-bit words 202, 204, . . . 206 with a randomly generated x-bit word in a contiguous fashion. That is, if the first candidate random number R is determined to not be prime, then the subsequent random number $R_2$ is generated by replacing, for example, the first x-bit word 202 with a random x-bit value. If the random number $R_2$ is also determined not to be prime then the next subsequent random number $R_3$ is generated by replacing the second x-bit word 204 with a random x-bit value. Thus, the x-bit words may be replaced in a contiguous fashion (i.e., the x-bit words replaced have contiguous word numbers) until all n x-bit words have been replaced, and assuming no prime number has yet been detected, the first x-bit word 202 is again replaced, then the second 204, and so on.

According to one aspect, the aforementioned example may be implemented using a rotate/shift command. For example, step 308 of FIG. 3 may be performed by rotating/shifting the z-bit random number R to the left or right by one x-bit word and then replacing a word in a fixed location (e.g., the most significant bit word or the least significant bit word) with a randomly generated x-bit word.

According to another aspect, the x-bit words 202, 204, . . . 206 may be replaced in a non-contiguous fashion. For example, if the first candidate random number R is determined to not be prime, then the subsequent random number $R_2$ is generated by replacing, for example, the second x-bit word 204 with a random x-bit value. If the random number $R_2$ is also determined not to be prime then the next subsequent random number $R_3$ is generated by replacing the n-th x-bit word 206 with a random x-bit value. Thus, in this case, the x-bit words 202, 204, . . . 206 are replaced in a non-contiguous (even random) manner (i.e., the x-bit words replaced have non-contiguous word numbers).

According to another aspect, one x-bit word 202, 204, . . . 206 may be replaced a plurality of times before another x-bit word 202, 204, . . . 206 or another portion of the z-bit random number R, $R_2$, $R_3$, etc. is replaced. For example, if the first candidate random number R is determined to not be prime, then the subsequent random number $R_2$ is generated by replacing, for example, the first x-bit word 202 with a random x-bit value. If the random number $R_2$ is also determined not to be prime then the next subsequent random number $R_3$ is generated by again replacing the first x-bit word 202 with another random x-bit value. In this fashion, assuming a prime number is not detected, the first x-bit word 202 may be replaced with different random x-bit values a plurality of times before moving on and replacing another word (e.g., the second x-bit word 204) with a randomly generated value. According to one aspect, a first x-bit word 202 may be replaced with a random x-bit value a predefined number of times (e.g., any integer value greater than one (1)) before moving on and replacing a second x-bit word 204 with randomly generated values.

Referring to FIG. 2, as used herein, the term "first x-bit word" does not necessarily refer to x-bit word A 202 but instead refers to any x-bit word 202, 204, . . . 206 because the term "first" merely helps differentiate and identify one x-bit word from another x-bit word. Similarly, the term "second x-bit word" does not necessarily refer to x-bit word B 204 but instead refers to any x-bit word 202, 204, . . . 206 other than the first x-bit word. Thus, the term "second" merely helps differentiate and identify one x-bit word from another first x-bit word. The same principle applies to subsequently numbered x-bit words (e.g., third x-bit word, fourth x-bit word, . . . n-th x-bit word, etc.).

Figure 4:
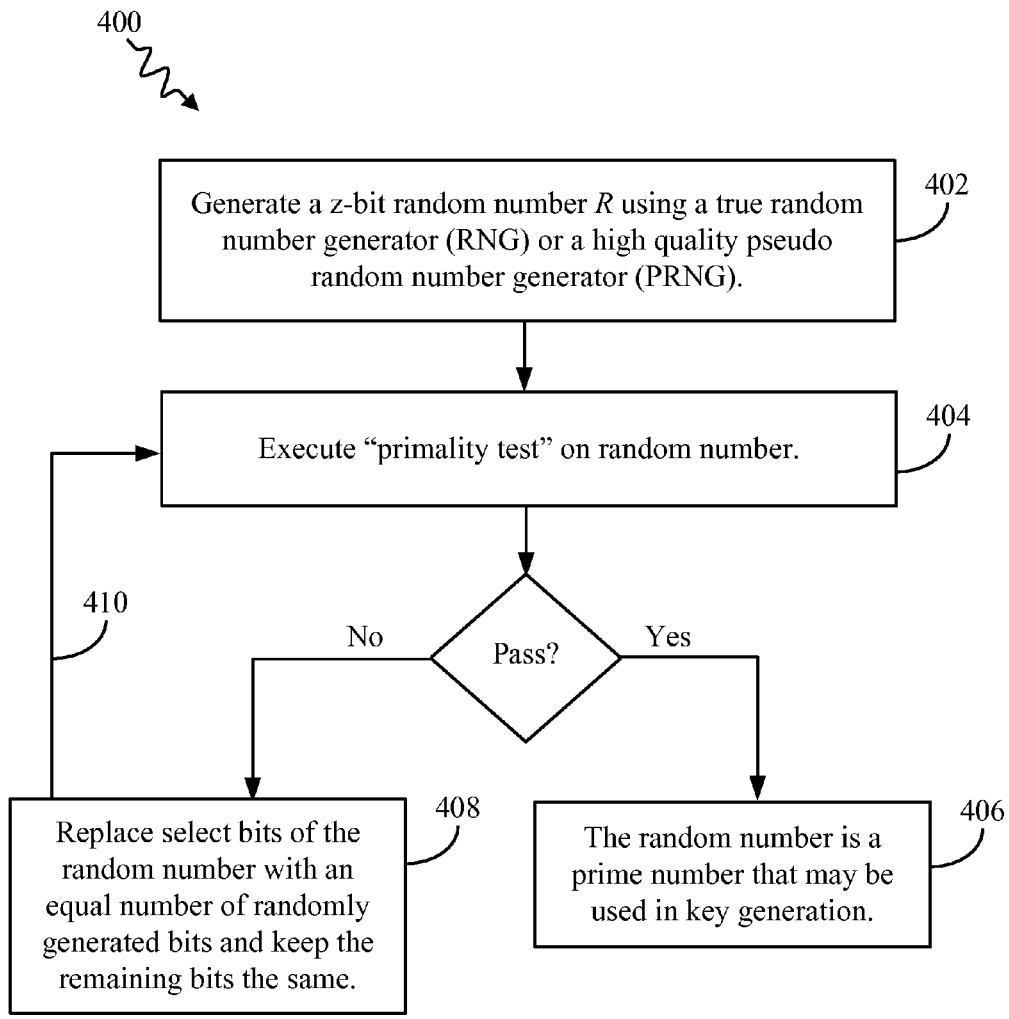

FIG. 4 illustrates a method 400 for prime number generation according to another aspect of the present disclosure. First, a z-bit random number R (e.g., number R 200 in FIG. 2) is generated 402. The random number R is a candidate number that may or may not be prime. Next, a primality test (e.g., Miller-Rabin test) is executed on the candidate number R 404. If the candidate number R passes the primality test (i.e., it is determined to some degree of accuracy that R may be prime) then the random number R is selected as a prime number 406. The number R may then be, for example, used for key generation.

Otherwise, if the candidate number R fails the primality test (i.e., it is determined to some degree of accuracy that R is not prime) then a select number of bits of the random number R are replaced with an equal number of randomly or pseudo-randomly generated bits to form a new random number $R_2$ while the remaining bits are kept the same 408. The new random number $R_2$ is then fed back into the primality test 410. This process is repeated such that if the random number $R_2$ fails the primality test, then another, different bit portion of $R_2$ is replaced with other randomly or pseudo-randomly generated bits to form a new random number $R_3$. The primality test is then executed on $R_3$. Eventually a prime number may be generated/detected and the process 400 is stopped. According to one example, each of the candidate random numbers R, $R_2$, $R_3$ have at least eight (8) bits and the portion of the plurality of bits replaced is at least two (2) bits.

A couple non-limiting instances of the process 400 will now be described to serve as examples.

As a first example, a random candidate number R having 2,048 bits may be initially generated using a PRNG (e.g., step 402). Then, a primality test, such as the Miller-Rabin test may be executed on the candidate number R upon which it may then be determined that the candidate number R is not prime (e.g., step 404). Next, a bit portion of the candidate number R is replaced with a randomly generated value having the same bit length. For example, a 64-bit portion of R starting at bit number 344 and ending at bit number 407 (most significant bit (MSB) is bit number 1) is replaced with a randomly generated 64-bit value to produce a new random number $R_2$ (e.g., step 408).

The primality test is then executed on the candidate number $R_2$ upon which it may be determined that the candidate number $R_2$ is not prime (e.g., step 404). Again, a bit portion of the candidate number $R_2$ is replaced with a randomly generated value having the same bit length. This time, for example, a 32 bit portion of $R_2$ starting at bit number 1,234 and ending at bit number 1,265 may be replaced with a randomly generated 32 bit value to produce a new random number $R_3$ (e.g., step 408). A primality test is executed on $R_3$ and this process of replacing bit portions of a failed candidate number to generate a new candidate number is repeated until it is determined that a candidate number passes the primality test (e.g., step 406).

As a second example, a random candidate number R having 512 bits may be initially generated using a PRNG (e.g., step 402). Then, a primality test, such as the Miller-Rabin test may be executed on the candidate number R upon which it may then be determined that the candidate number R is not prime (e.g., step 404). Next, a non-contiguous bit portion of the candidate number R is replaced with an equal number of randomly generated bits. For example, 48 bits of the candidate number R may be replaced with an equal number (i.e., 48) of randomly generated bits (e.g., step 408). In one instance, some of these bits may include, among others, bit numbers 12, 44, 77, 223, and 498. That is, unlike the prior example, the bits are not selected and replaced in block form. Rather, the bits are randomly selected and replaced. Once the bits have been replaced a new random candidate number $R_2$ is thus generated.

The primality test is then executed on the candidate number $R_2$ upon which it may be determined that the candidate number $R_2$ is not prime (e.g., step 404). Again, a random portion of bits of the candidate number $R_2$ is replaced with an equal number of randomly generated bits. This time, for example, 32 bits of the candidate number $R_2$ may be replaced with an equal number (i.e., 32) of randomly generated bits (e.g., step 408). In one instance, some of these bits may include, among others, bit numbers 9, 24, 124, 332, and 506. Once the bits have been replaced a new random number $R_3$ is thus generated. A primality test is executed on $R_3$ and this process of selecting and replacing random bits of a failed candidate number to generate a new candidate number is repeated until it is determined that a candidate number passes the primality test (e.g., step 406).

Figure 5:
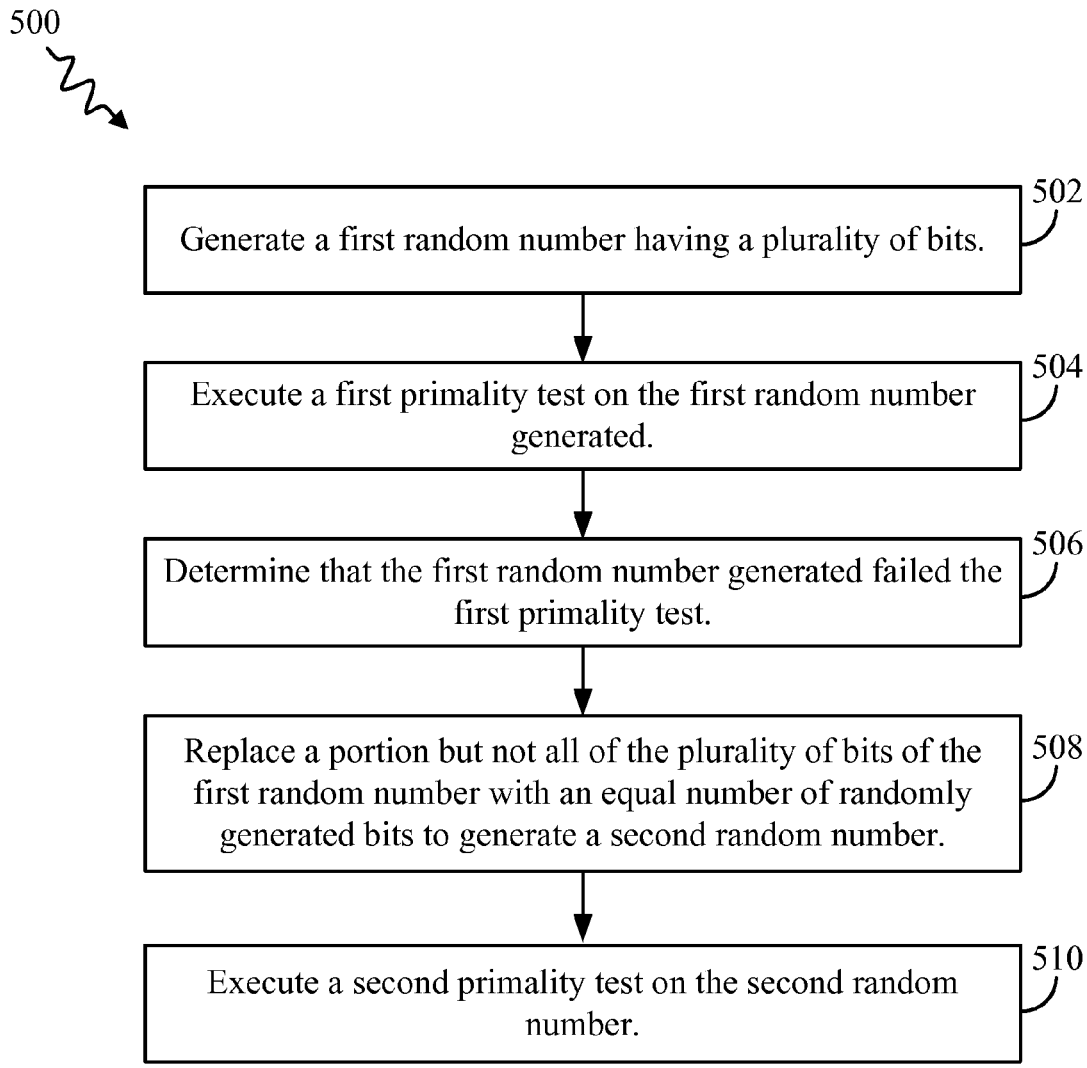

FIG. 5 illustrates a method 500 for generating prime numbers according to one aspect of the disclosure. Initially, a first random number is generated having a plurality of bits 502. Next, a first primality test is executed on the first random number generated 504. Then, it is determined that the first random number generated failed the first primality test 506. Next, a portion but not all of the plurality of bits of the first random number is replaced with an equal number of randomly generated bits to generate a second random number 508. Then, a second primality test is executed on the second random number 510. According to one aspect, it is determined that the second random number fails the second primality test, and portions but not all of the plurality of bits of the second random number are replaced with equal numbers of randomly generated bits and successive primality tests are run on the second random number until it is determined that the second random number passes one of the successive primality tests.

Exemplary Device

Figure 6:
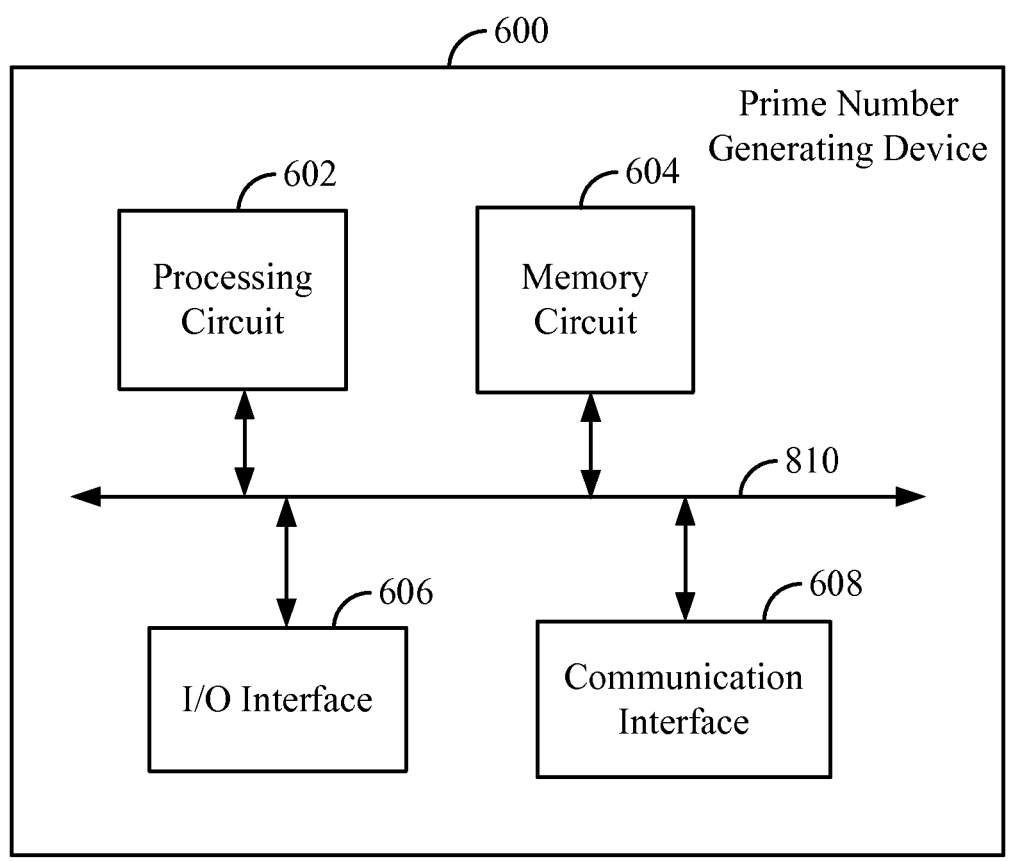
FIG. 6 illustrates a schematic block diagram of a prime number generating device.

FIG. 6 illustrates a schematic block diagram of a prime number generating device 600 according to one aspect of the disclosure. The prime number generating device 600 may include a processing circuit 602, a memory circuit 604, an input/output (I/O) interface 606, and/or a communication interface 608, which are communicatively coupled through a bus 610. The processing circuit 602 includes at least one processor (e.g., application specific integrated circuit, digital signal processor, application processor, etc.) that is adapted to perform any of the operations described above with respect to FIGS. 3, 4, and 5 including, but not limited to, generating random numbers and selecting and replacing bits of a z-bit random number R. The memory circuit 604 includes one or more volatile, non-volatile memory circuits, and/or computer-readable media including, but not limited to, SRAM, DRAM, SDRAM, NAND FLASH, NOR FLASH, hard disk drives, compact discs (CDs), etc. The memory circuit 604 is adapted to store, among other things, computer-readable instructions that when executed by one or more processors cause the processing circuit 604 to perform the operations described above with respect to FIGS. 3, 4, and 5.

The I/O interface 606 may include any one of a plurality of input and output devices including, but not limited to, a display, a keyboard, a touchscreen display, a mouse, a camera, a joystick, etc. The communication interface 608 may include a wireless communication interface and/or a wired communication interface that allows the prime number generating device 600 to communicate with one or more networks (e.g., cellular network) and/or other electronic devices. The communication interface 608 may also include serial and parallel communication ports (e.g., USB, etc.).

Figure 7:
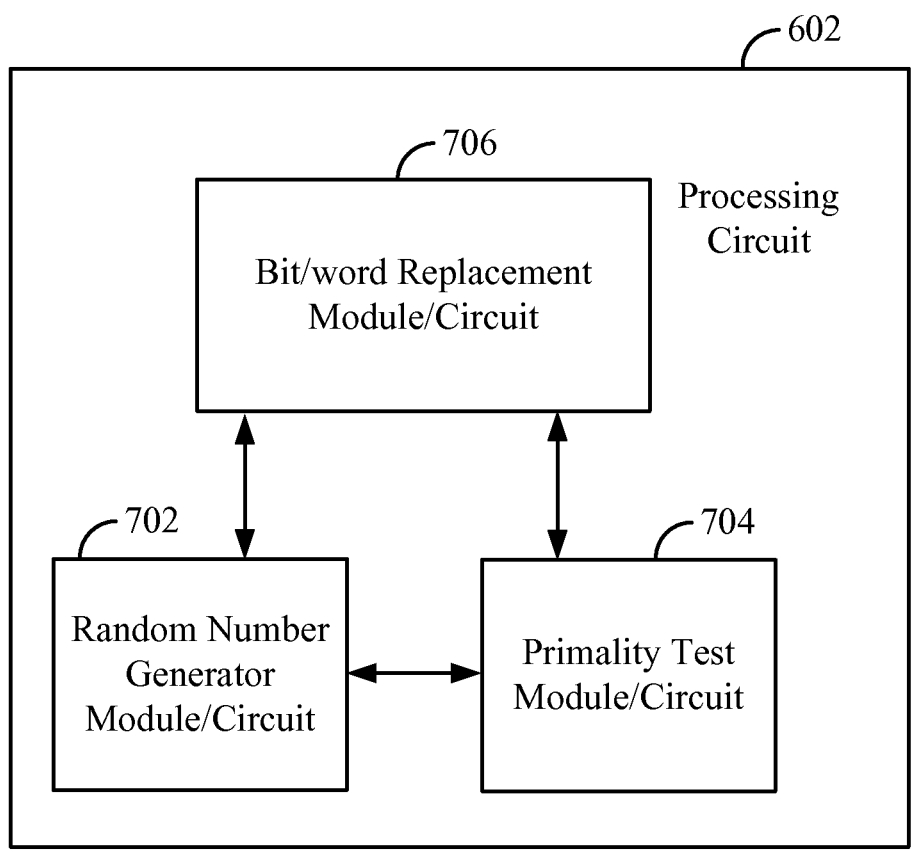
FIG. 7 illustrates a schematic block diagram of the prime number generating device's processing circuit.

FIG. 7 illustrates a schematic block diagram of the prime number generating device's processing circuit 602 according to one aspect of the disclosure. The processing circuit 602 may comprise a random number generator module/circuit 702, a primality test module/circuit 704, and/or a bit/word replacement module/circuit 706. The circuits 702, 704, 706 may be communicatively coupled to one another as indicated by the double arrows shown in FIG. 7. The circuits 702, 704, 706 may be application specific integrated circuits (ASICs) that are hard wired to perform various operations and/or method steps described herein with respect to FIGS. 2, 3, 4, and/or 5. Although the circuits 702, 704, 706 are shown in the illustrated example as being a part of the processing circuit 602, in some aspects each circuit 702, 704, 706 may be an independent circuit that is physically distinct from each other and/or the processing circuit 602.

Generally, the random number generator module/circuit 702 may be a means for generating the random numbers R, $R_2$, $R_3$, random bits, and random x-bit words described in the various methods/processes above. Specifically, the random number generator module/circuit 702 may be a: means for generating a first random number having a plurality of bits; means for generating an equal number of random bits to assist in the generation a second random number; and means for generating random x-bit words.

Generally, the primality test module/circuit 704 may be a means for executing primality tests (such as the Miller-Rabin primality test or the Solovay-Strassen primality test) on various candidate numbers to determine whether or not (to a certain degree of reliability) the candidate numbers are prime. Specifically, the primality test module/circuit 704 may be a: means for executing a first primality test on the first random number generated; means for determining that the first random number generated failed the first primality test; means for executing a second primality test on the second random number; means for determining that the second random number failed the second primality test; and means for executing a third primality test on the third random number.

Generally, the bit/word replacement module/circuit 706 may be a means for replacing bit portions and words of a candidate number with other randomly generated bits and words. Specifically, the bit/word replacement module/circuit 706 may be a: means for replacing a portion but not all of the plurality of bits of the first random number with an equal number of randomly generated bits to generate a second random number; means for replacing portions but not all of the plurality of bits of the second random number with equal numbers of randomly generated bits and running successive primality tests on the second random number until it is determined that the second random number passes one of the successive primality tests; means for rotating the first random number to the left or right by at least one x-bit word prior to replacing the portion of the plurality of bits with the first x-bit word; means for replacing a portion but not all of a plurality of bits of the second random number with an equal number of randomly generated bits to generate a third random number; means for replacing the first x-bit word of the second random number with randomly generated x-bit words and running successive primality tests on the second random number until it is determined that the second random number passes one of the successive primality tests or it is determined that the first x-bit word of the second random number has been replaced a predefined number of times; and means for replacing a second x-bit word of the second random number with a randomly generated x-bit word if it is determined that the first x-bit word of the second random number has been replaced the predefined number of times.

Figure 8:
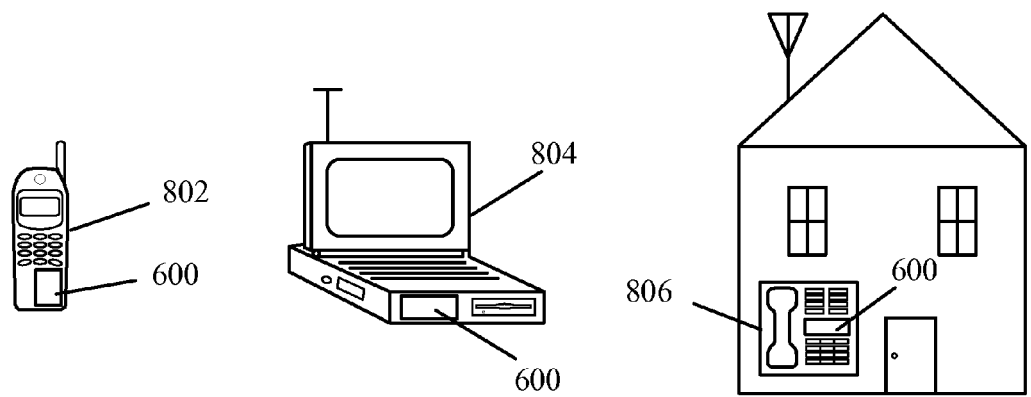
FIG. 8 illustrates various electronic devices that may be integrated with the prime number generating device.

FIG. 8 illustrates various electronic devices 802, 804, 806 that may be integrated with the prime number generating device 600. For example, a mobile telephone 802, a laptop computer 804, and a fixed location terminal 806 may include the prime number generating device 600. The electronic devices 802, 804, 806 illustrated in FIG. 8 are merely exemplary. Other electronic devices may also feature the prime number generating device 600 including, but not limited to, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof.

One or more of the components, steps, features, and/or functions illustrated in FIGS. 2-8 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 6, 7, and 8 may be configured to perform one or more of the methods, features, or steps described in FIGS. 2-5. The algorithms described herein may also be efficiently implemented in software and/or embedded in hardware.

Moreover, in one aspect of the disclosure, the processing circuit 602 illustrated in FIGS. 6 and 7 may be a specialized processor (e.g., an application specific integrated circuit (e.g., ASIC)) that is specifically designed and/or hard-wired to perform the algorithms, methods, and/or steps described in FIGS. 3, 4, and 5. Thus, such a specialized processor (e.g., ASIC) may be one example of a means for executing the algorithms, methods, and/or steps described in FIGS. 3, 4, and 5.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method comprising:
(a) generating, via a random number generator, a random number having a plurality of bits, the random number stored in a first memory circuit;
(b) executing, via a primality test circuit, a primality test on the random number stored in the first memory circuit;
(c) determining, via the primality test circuit, that the random number stored in the first memory circuit failed the primality test;
(d) shifting the random number stored in the first memory circuit by an x number of bit(s) either to (i) the left and replacing, via a bit replacement circuit, the x number of least significant bit(s) of the random number stored in the first memory circuit with randomly generated bit(s), or (ii) the right and replacing, via the bit replacement circuit, the x most significant bit(s) of the random number stored in the first memory circuit with randomly generated bit(s),
wherein the number x is greater than or equal to one (1) and less than a total number of bits of the random number;
(e) iteratively repeating (b), (c), and (d) until it is determined that the random number stored in the first memory circuit passed the executed primality test executed in (b);
(f) storing the random number determined to have passed the primality test in a second memory circuit; and
(g) at least one of executing, via a processing circuit, a cryptographic function to secure data with the random number stored in the second memory circuit and/or generating, via the processing circuit, a cryptographic key using the random number stored in the second memory circuit.

2. The method of claim 1, wherein the random number comprises a plurality of x-bit words each having x number of bits.

3. The method of claim 1, wherein the random number has at least eight (8) bits, and the number x is equal to or greater than two (2) and less than the total number of bits of the random number.

4. The method of claim 1, further comprising:
executing, via the processing circuit, the cryptographic function to secure data with the random number stored in the second memory circuit.

5. The method of claim 1, further comprising:
generating, via the processing circuit, the cryptographic key using the random number stored in the second memory circuit.

6. An apparatus comprising:
a random number generator circuit adapted to generate a random number having a plurality of bits;
a first memory circuit communicatively coupled to the random number generator circuit, the first memory circuit adapted to store the random number;
a primality test circuit communicatively coupled to the random number generator circuit, the primality test circuit adapted to:
(a) execute a primality test on the random number stored in the first memory circuit; and
(b) determine that the random number generated failed the primality test;
a bit replacement circuit communicatively coupled to the primality test circuit, the bit replacement circuit adapted to:
(c) either shift the random number stored in the first memory circuit by an x number of bit(s) to the left and replace the x number of least significant bit(s) of the random number stored in the first memory circuit with randomly generated bit(s), or shift the random number stored in the first memory circuit by an x number of bit(s) to the right and replace the x number of most significant bit(s) of the random number stored in the first memory circuit with randomly generated bit(s),
wherein the number x is greater than or equal to one (1) and less than a total number of bits of the random number, and (a), (b), and (c) are iteratively repeated until the primality test circuit determines that the random number stored in the first memory circuit passed the primality test executed in (a);
a second memory circuit communicatively coupled to the bit replacement circuit, the second memory circuit adapted to store the random number determined to have passed the primality test; and
a processing circuit communicatively coupled to the second memory circuit, the second memory circuit adapted to perform at least one of:
execute a cryptographic function to secure data with the random number stored in the second memory circuit; and/or
generate a cryptographic key using the random number stored in the second memory circuit.

7. The apparatus of claim 6, wherein the random number comprises a plurality of x-bit words each having x number of bits.

8. The apparatus of claim 6, wherein the random number has at least eight (8) bits, and the number x is equal to or greater than two (2) and less than the total number of bits of the random number.

9. The apparatus of claim 6, wherein the processing circuit is adapted to execute the cryptographic function to secure data with the random number stored in the second memory.

10. The apparatus of claim 6, wherein the processing circuit is adapted to generate the cryptographic key using the random number stored in the second memory.

11. An apparatus comprising:
- means for generating adapted (a) generate a random number having a plurality of bits, the random number stored in a memory circuit;
- means for executing adapted to (b) execute a primality test on the random number stored in the memory circuit;
- means for determining adapted to (c) determine that the random number stored in the memory circuit failed the primality test;
- means for shifting adapted to (d) shift the random number stored in the memory circuit by an x number of bit(s) either to (i) the left and replace the x number of least significant bit(s) of the random number stored in the memory circuit with randomly generated bit(s), or (ii) the right and replace the x most significant bit(s) of the random number stored in the memory circuit with randomly generated bit(s),
- wherein the number x is greater than or equal to one (1) and less than a total number of bits of the random number, and (a), (b), (c), and (d) are iteratively repeated until the means for executing determines that the random number stored in the memory circuit passed the primality test executed in (b);
- means for storing the random number determined to have passed the primality test; and
- at least one of means for executing a cryptographic function to secure data with the random number stored in the means for storing and/or means for generating a cryptographic key using the random number stored in the second memory circuit.

12. The apparatus of claim 11, wherein the first random number comprises a plurality of x-bit words each having x number of bits.

13. The apparatus of claim 11, wherein the random number has at least eight (8) bits, and the number x is equal to or greater than two (2) and less than the total number of bits of the random number.

14. The apparatus of claim 11, further comprising:
- means for executing the cryptographic function to secure data with the random number stored in the means for storing.

15. The apparatus of claim 11, further comprising:
- means for generating the cryptographic key using the random number stored in the means for storing.

16. A non-transitory computer-readable storage medium having one or more instructions stored thereon, the instructions which when executed by at least one processor causes the processor to:
- (a) generate, via a random number generator, a random number having a plurality of bits, the random number stored in a first memory circuit;
- (b) execute, via a primality test circuit, a primality test on the random number stored in the first memory circuit;
- (c) determine, via the primality test circuit, that the random number stored in the first memory circuit failed the primality test;
- (d) shift the random number stored in the first memory circuit by an x number of bit(s) either to (i) the left and replace, via a bit replacement circuit, the x number of least significant bit(s) of the random number stored in the first memory circuit with randomly generated bit(s), or (ii) the right and replace, via the bit replacement circuit, the x most significant bit(s) of the random number stored in the first memory circuit with randomly generated bit(s),
- wherein the number x is greater than or equal to one (1) and less than a total number of bits of the random number;
- (e) iteratively repeat (b), (c), and (d) until it is determined that the random number stored in the first memory circuit passed the executed primality test executed in (b);
- (f) store the random number determined to have passed the primality test in a second memory circuit; and
- (g) at least one of execute, via a processing circuit, a cryptographic function to secure data with the random number stored in the second memory circuit and/or generate, via the processing circuit, a cryptographic key using the random number stored in the second memory circuit.

17. The non-transitory computer-readable storage medium of claim 16, wherein the first random number comprises a plurality of x-bit words each having x number of bits.

18. The non-transitory computer-readable storage medium of claim 16, wherein the random number has at least eight (8) bits, and the number x is equal to or greater than two (2) and less than the total number of bits of the random number.

19. The non-transitory computer-readable storage medium of claim 16, wherein the instructions when executed by the processor further cause the processor to:
- execute, via the processing circuit, the cryptographic function to secure data with the random number stored in the second memory circuit.

20. The non-transitory computer-readable storage medium of claim 16, wherein the instructions when executed by the processor further cause the processor to:
- generate, via the processing circuit, the cryptographic key using the random number stored in the second memory circuit.

* * * * *